United States Patent
Yamazaki

(10) Patent No.: US 10,944,876 B2
(45) Date of Patent: Mar. 9, 2021

(54) IMAGE PROCESSING APPARATUS, CONTROL METHOD, AND STORAGE MEDIUM

(71) Applicant: CANON KABUSHIKI KAISHA, Tokyo (JP)

(72) Inventor: Masahito Yamazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/738,476

(22) Filed: Jan. 9, 2020

(65) Prior Publication Data

US 2020/0228668 A1    Jul. 16, 2020

(30) Foreign Application Priority Data

Jan. 16, 2019    (JP) .............................. JP2019-004840

(51) Int. Cl.
*H04N 1/00*    (2006.01)

(52) U.S. Cl.
CPC ....... *H04N 1/00037* (2013.01); *H04N 1/0005* (2013.01); *H04N 1/00076* (2013.01); *H04N 1/00411* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 6,295,140 B1* | 9/2001 | Kameyama ............ | H04N 1/401 358/461 |
| 2005/0018235 A1* | 1/2005 | Shikata ................. | G06F 3/1284 358/1.14 |

FOREIGN PATENT DOCUMENTS

JP    2010-111044 A    5/2010

* cited by examiner

*Primary Examiner* — Ibrahim Siddo
(74) *Attorney, Agent, or Firm* — Canon U.S.A., Inc. I.P. Division

(57) ABSTRACT

An image processing apparatus includes an operation unit having a display device, and includes a sensor to detect an abnormality of the operation unit. Where the sensor detects an operation unit abnormality, display data is generated for performing display including an error notification regarding the detected abnormality. The generated display data is provided to at least one of the display device and an information processing apparatus. In a case where (i) first data for performing display includes the error notification, includes an instruction portion to receive an instruction to continuously use the image processing apparatus, and is provided as provided display data, and (ii) an instruction to continuously use the image processing apparatus is received via the instruction portion, screen data is provided, in place of the generated display data, the provided display data for displaying a screen for using an the image processing apparatus function.

8 Claims, 14 Drawing Sheets

FIG.6

ERROR NOTIFICATION SCREEN
600 (EQUIPPED WITH OPERATION
CONTINUATION BUTTON)

 TURN ON AGAIN POWER SWITCH ON RIGHT SIDE SURFACE OF MAIN BODY.

604 · INFORM RESPONSIBLE PERSON OF FOLLOWING CODE IF MFP DOES NOT NORMALLY OPERATE EVEN THOUGH ABOVE OPERATION IS PERFORMED.

ERROR CODE:
601 ▷ E000xxx-0000:

ERROR LOCATION:
602 ▷ U000xxx-0000:

WHEN YOU WANT TO CONTINUE OPERATION OF MAIN BODY IF MFP DOES NOT NORMALLY OPERATE EVEN THOUGH POWER SWITCH ON RIGHT SIDE SURFACE OF MAIN BODY IS PRESSED AGAIN, PRESS [CONTINUE OPERATION].

603 — [ CONTINUE OPERATION ]

FIG.14

IMAGE PROCESSING APPARATUS, CONTROL METHOD, AND STORAGE MEDIUM

BACKGROUND

Field

The present disclosure relates to an image processing apparatus including a display unit.

Description of the Related Art

A multifunction peripheral (MFP) is an apparatus that performs information processing, and at the same time, an image processing apparatus including mechanical, electrical, or optical functional units such as a printer or a scanner therein, and further including an operation unit that receives an operation performed by a user. When the occurrence of an error such as a functional abnormality or a malfunction is detected in any of these functional units, the MFP displays an error notification screen on a screen of the operation unit as necessary, and notifies the user that the error has occurred.

At the same time, an abnormality may also occur in the operation unit of the MFP. Examples of such an abnormality include an abnormality of a display system that is attributed to an abnormality of a screen display module (partial malfunction of liquid crystal panel, backlight burnout, module cable failure, etc.), and an abnormality of an operation system that is attributed to an abnormality of a touch panel module or hardware keys (sensor malfunction or module cable failure).

For example, Japanese Patent Application Laid-Open No. 2010-111044 discusses an image forming apparatus including an operation unit having a touch panel and a plurality of hardware keys. In the image forming apparatus discussed in Japanese Patent Application Laid-Open No. 2010-111044, if a malfunction of any of the plurality of hardware keys is detected, an error message indicating that the hardware key in which the malfunction has been detected is unusable is displayed on the touch panel.

Nevertheless, a malfunction may also occur in the touch panel or a screen display module of the operation unit as described above. In this case, the user cannot be notified of the detected occurrence of the malfunction.

In addition, there are some cases where, even if an abnormality occurs in an operation unit, the function of a functional unit such as a printer or a scanner has no abnormality, and thus the user may want to continuously use the MFP.

SUMMARY

According to an aspect of the present disclosure, an image processing apparatus, having an operation unit and a sensor, wherein the operation unit includes a display device and the sensor is configured to detect an abnormality of the operation unit, includes one or more processors, and memory storing instructions that, when executed by the one or more processors, cause the image processing apparatus to perform operations including: generating, in a case where the sensor detects an abnormality of the operation unit, display data for performing display including a first error notification regarding the detected abnormality, providing the generated display data to at least one of the display device and an information processing apparatus connected via a network using a remote control application, and providing screen data, in a case where (i) first data for performing display includes the first error notification, includes an instruction portion configured to receive an instruction to continuously use the image processing apparatus, and is provided as provided display data, and (ii) an instruction to continuously use the image processing apparatus is received via the instruction portion, wherein the screen data is data for in place of the display includes the first error notification, for displaying a screen for using a function of the image processing apparatus.

Further features of the present disclosure will become apparent from the following description of exemplary embodiments with reference to the attached drawings.

BRIEF DESCRIPTION OF THE DRAWINGS

FIG. 6 illustrates an example of an error notification screen (equipped with an operation continuation button).

FIG. 14 illustrates an example of a remote user interface (UI) screen displayed on a client terminal.

DESCRIPTION OF THE EMBODIMENTS

Hereinafter, exemplary embodiments of the present disclosure will be described with reference to the drawings. The exemplary embodiments to be described below are mere examples, and not intended to limit the scope of the present disclosure to these exemplary embodiments.

Hereinafter, a first exemplary embodiment will be described. In the first exemplary embodiment, the description will be given using, as an example of an information processing apparatus, a multifunction peripheral (MFP) 100 being an image processing apparatus that implements a plurality of types of functions such as copying, fax, and printing. The MFP 100 has a function of performing error notification if an abnormality occurs in each unit (internal component).

Figure 1:
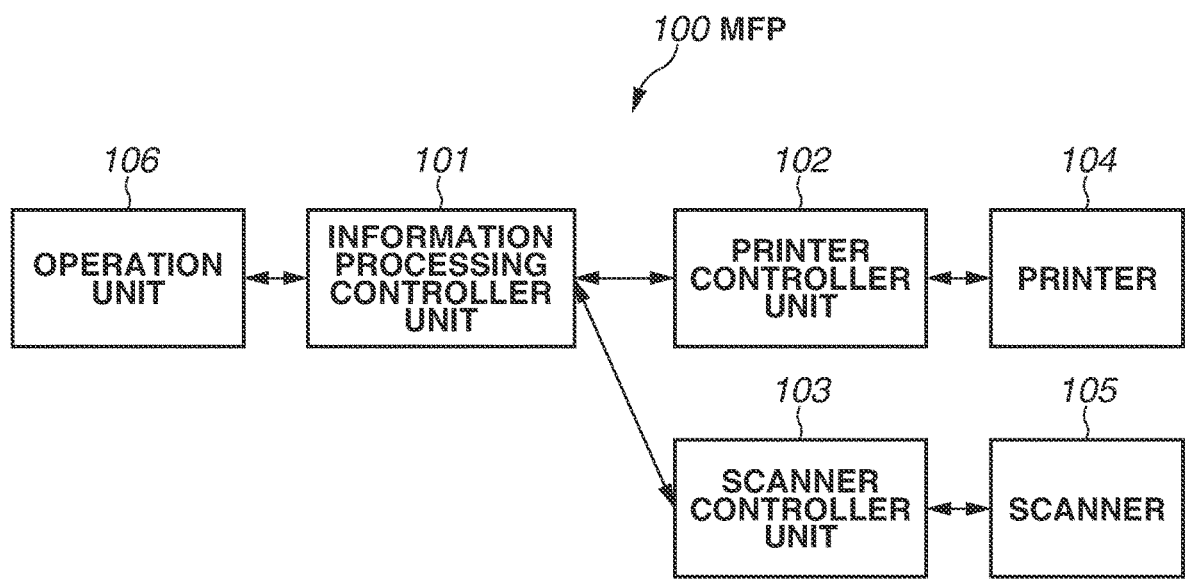
FIG. 1 is a block diagram illustrating a hardware configuration of a multifunction peripheral (MFP).

FIG. 1 is a block diagram illustrating a hardware configuration of the MFP 100.

The MFP 100 includes units such as an information processing controller unit 101, a printer controller unit 102, a scanner controller unit 103, a printer 104, and a scanner 105. The MFP 100 further includes an operation unit 106.

The information processing controller unit 101 is a controller that manages information processing control related to the operation of the MFP 100, and is connected to the operation unit 106. The information processing controller unit 101 is further connected to the printer controller unit 102 that controls the printer 104 serving as an image output device, and to the scanner controller unit 103 that controls the scanner 105 serving as an image input device.

As described below with reference to FIG. 3, the operation unit 106 includes a display device such as a liquid crystal display (LCD), and provides a user with information regarding an error of the MFP 100. In addition, the operation unit 106 includes an operation device such as a touch panel, and transmits information regarding a user operation to the information processing controller unit 101 based on a coordinate value.

Using an application program, the information processing controller unit 101 provides image data to be displayed on the operation unit 106.

Figure 2:
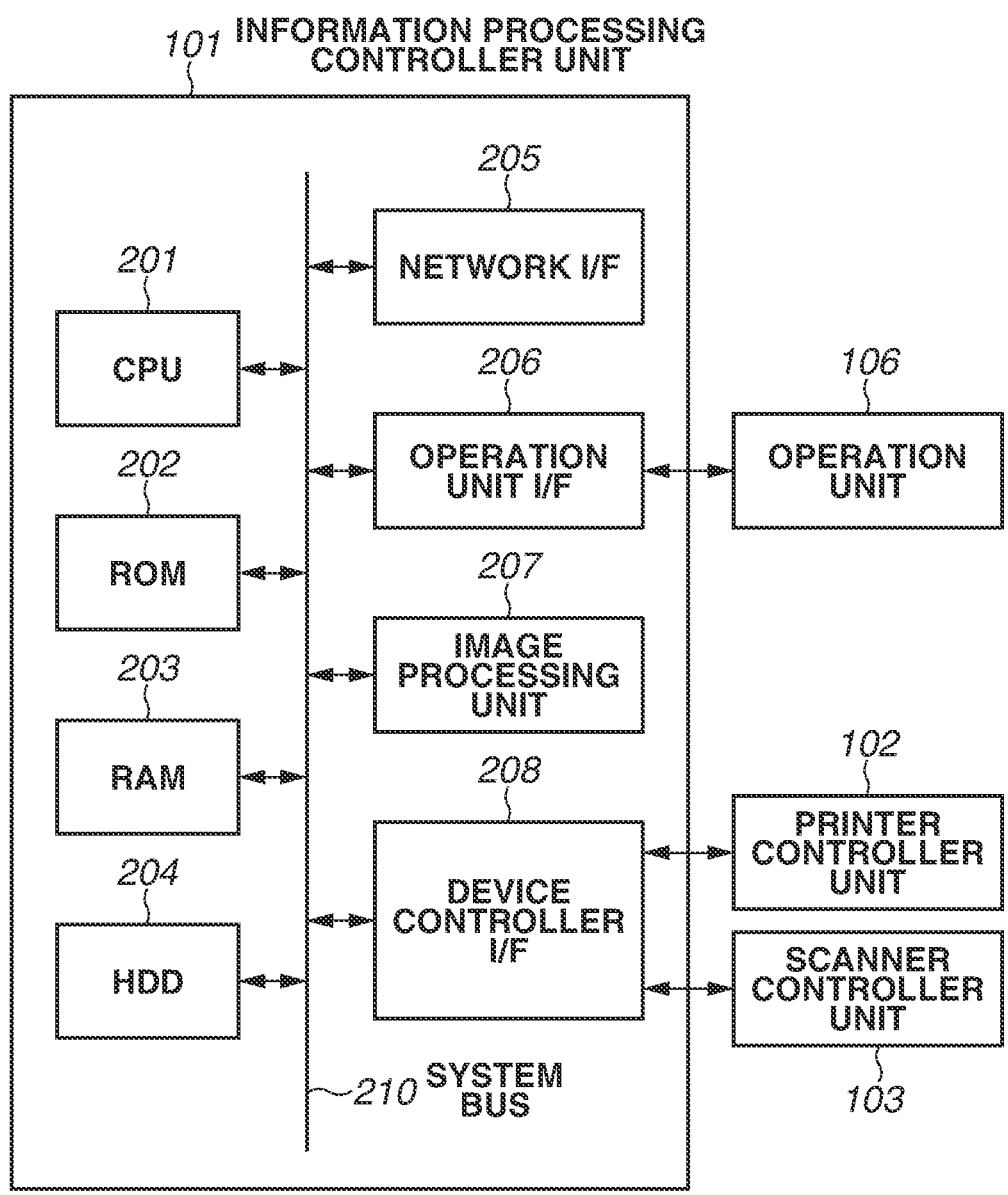
FIG. 2 is a block diagram illustrating a hardware configuration of an information processing controller unit.

FIG. 2 is a block diagram illustrating a hardware configuration of the information processing controller unit 101 of the MFP 100.

A central processing unit (CPU) 201 starts up an operating system (OS) based on a boot program stored in a read-only memory (ROM) 202. The CPU 201 executes an application program stored in a hard disk drive (HDD) 204 on the OS, and implements functions such as scanning, printing, and fax, and various functions that use a network or a memory storage. In addition, the OS and the application program detect occurrence of an error in various units included in the MFP 100 by monitoring states of the units.

A random access memory (RAM) 203 is used as a work area of the CPU 201. In addition, the RAM 203 provides the work area and also provides an image memory area for temporarily storing image data.

The HDD 204 stores an application program, image data, various setting values, an error history, and the like.

Together with the ROM 202, the RAM 203, and the HDD 204, an operation unit interface (I/F) 206, a device controller I/F 208, a network I/F 205, and an image processing unit 207 are connected to the CPU 201 via a system bus 210.

The operation unit I/F 206 is an interface to the operation unit 106 including an LCD unit that allows a touch panel operation. Image data for screen display that is to be displayed on the operation unit 106 is generated by the OS and the application program that operate on the CPU 201, and is output from the operation unit I/F 206 to the operation unit 106. In addition, information input on the operation unit 106 as a user operation is acquired via the operation unit I/F 206 by the OS and the application program that operate on the CPU 201.

The printer controller unit 102 and the scanner controller unit 103 are connected to the device controller interface (I/F) 208. In addition, the device controller I/F 208 performs synchronous/asynchronous conversion of image data.

The network I/F 205 is connected to an external network (not illustrated), and performs input-output of information with various external devices via the network.

The image processing unit 207 performs processing such as processing of an image to be output to the printer 104, processing of an image input from the scanner 105, image rotation, image compression, resolution conversion, color space conversion, and tone conversion.

Figure 3:
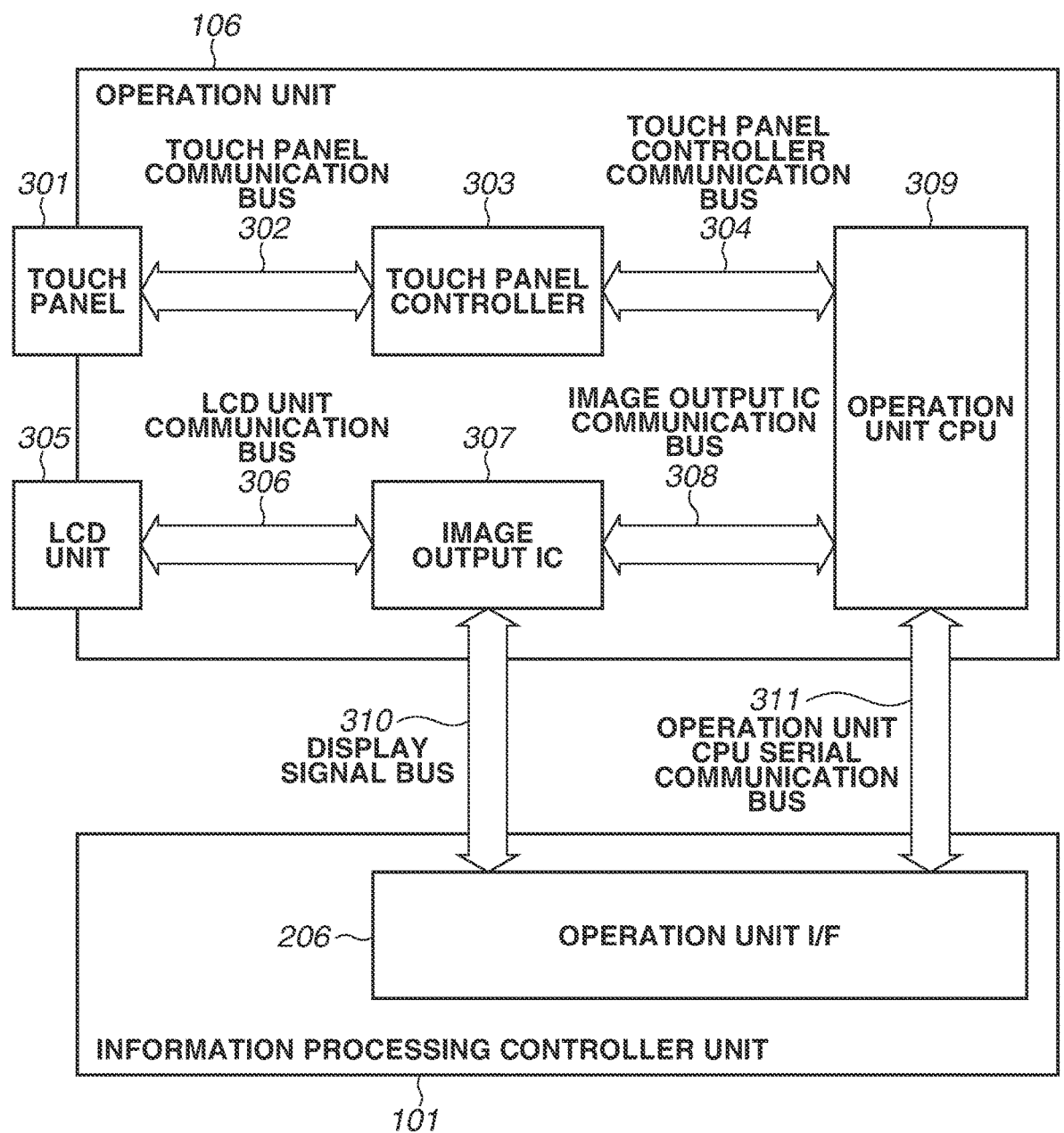
FIG. 3 is a block diagram illustrating an internal configuration of an operation unit and a connection configuration of the operation unit and the information processing controller unit.

FIG. 3 is a block diagram illustrating an internal configuration of the operation unit 106 and a connection configuration of the operation unit 106 and the information processing controller unit 101.

A touch panel 301 is made of material having high transparency and is disposed on the surface of the operation unit 106. A touch panel controller 303 is connected to and communicate with the touch panel 301 via a touch panel communication bus 302, thereby acquiring a user operation performed on the touch panel 301, as a coordinate value.

An LCD unit 305 is disposed immediately below the touch panel 301 in an overlapped manner, and displays a graphical user interface (GUI) screen that allows the user to input a touch onto the touch panel 301.

An image output integrated circuit (IC) 307 is connected to and communicates with the LCD unit 305 via an LCD unit communication bus 306, thereby transmitting image data for screen display to the LCD unit 305.

An operation unit CPU 309 is connected to and communicates with the touch panel controller 303 via a touch panel controller communication bus 304, and is also connected to and communicates with the image output IC 307 via an image output IC communication bus 308.

The operation unit 106 is connected to the operation unit I/F 206 of the information processing controller unit 101 via a display signal bus 310 and an operation unit CPU serial communication bus 311.

The image data for screen display that has been generated by the application program operating on the CPU 201 of the information processing controller unit 101 is transmitted to the image output IC 307 via the display signal bus 310. In addition, the application program instructs the operation unit CPU 309 to control the operation unit 106, and simultaneously acquires a coordinate value of a user operation performed on the touch panel 301 via the operation unit CPU serial communication bus 311.

Figure 4:
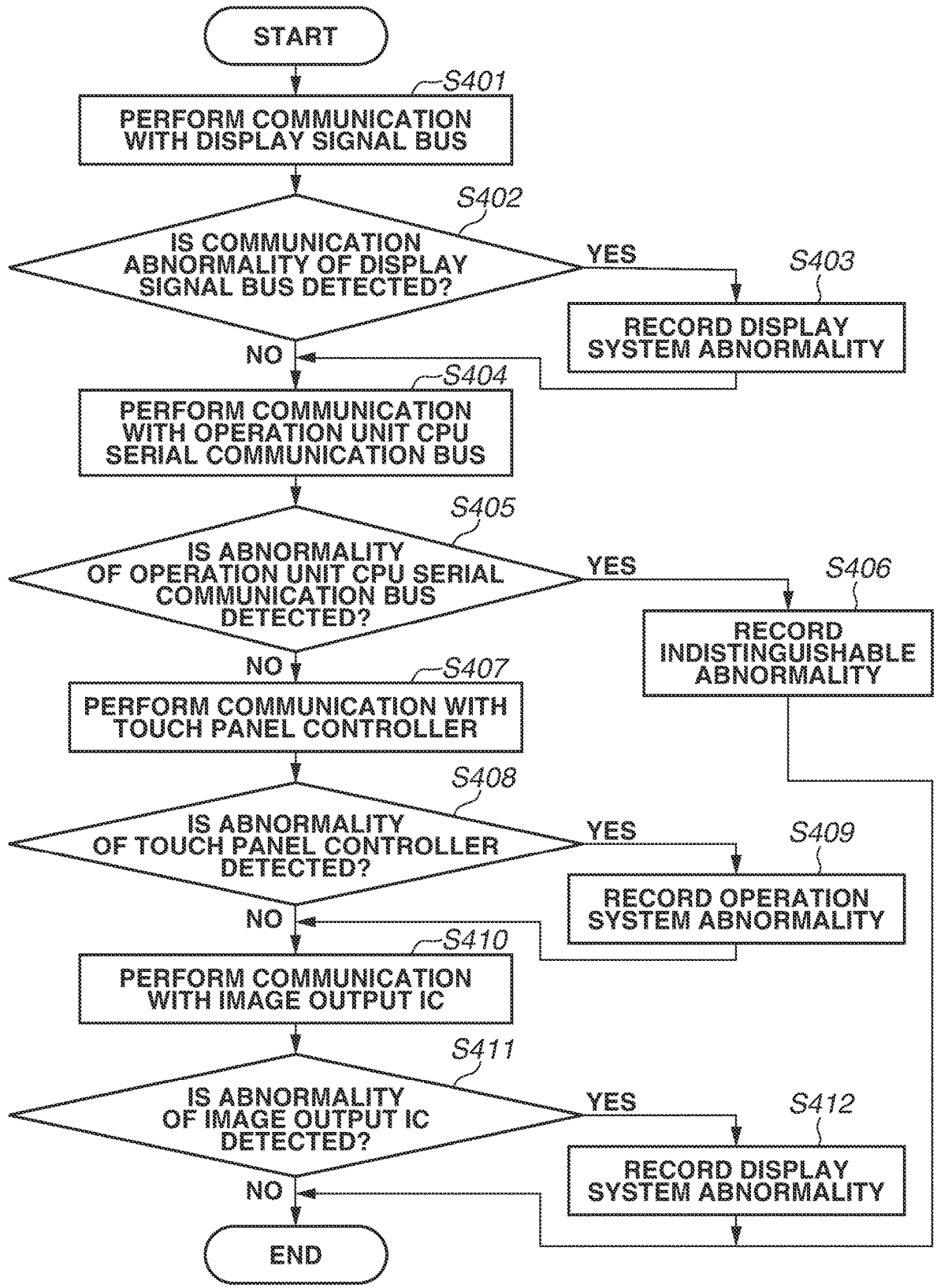
FIG. 4 is a flowchart illustrating a flow of abnormality detection processing of the operation unit.

FIG. 4 is a flowchart illustrating a flow of processing of detecting an abnormality of an operation of the operation unit 106 when operating the operation unit 106 (abnormality detection processing). The processing is executed by an application program operating on the CPU 201 of the information processing controller unit 101.

First of all, in step S401, the application program performs communication with the display signal bus 310.

Then, in step S402, the application program checks whether the communication with the display signal bus 310 is normal.

If an abnormality is not detected in the communication with the display signal bus 310 (NO in step S402), the processing proceeds to step S404.

On the other hand, if an abnormality is detected in the communication with the display signal bus 310 (YES in step S402), image data for screen display cannot be properly transmitted via the display signal bus 310. Then in step S403, the application program records information indicating that the operation unit 106 has an abnormality of the display system, in the RAM 203. The information indicating the abnormality of the display system is recorded in the format including an error code 601 and an error location code 602, which will be described below with reference to FIG. 6. By simultaneously recording the information indicating the abnormality of the display system in the HDD 204, an error history is made recordable/referable as nonvolatile information. The abnormality of the display system is attributed to an abnormality in the display device of the operation unit 106 such as the LCD unit 305.

Next, in step S404, the application program performs communication with the operation unit CPU serial communication bus 311.

Then, in step S405, the application program checks whether the communication with the operation unit CPU serial communication bus 311 is normal.

If an abnormality is detected in the communication with the operation unit CPU serial communication bus 311 (YES in step S405), an instruction to control the operation unit 106 and a coordinate value of a user operation cannot be properly acquired via the operation unit CPU serial communication bus 311. Then in step S406, the application program records information indicating that the operation unit 106 has an abnormality of an operation system, in the RAM 203. At the same time, the application program records the information indicating the abnormality of the operation system in the HDD 204. At this time, the application program records information indicating that it is impossible, or at least not possible, to distinguish between the abnormality of the display system and the abnormality of the operation system in this state, and the abnormality detection processing illustrated in the flowchart of FIG. 4 is ended. The abnormality of the operation system is an abnormality attributed to an abnormality in the operation device of the operation unit 106 such as the touch panel 301.

If the communication with the operation unit CPU serial communication bus 311 is normal (NO in step S405), the processing proceeds to detailed confirmation processing in step S407 and subsequent steps.

In step S407, the application program transmits an instruction for checking whether the operation unit CPU 309 properly controls the touch panel controller 303 to the operation unit CPU 309 via the operation unit CPU serial communication bus 311. In addition, the operation unit CPU 309 performs communication with the touch panel controller 303 via the touch panel controller communication bus 301, and if an abnormality is detected, the operation unit CPU 309 notifies the application program of the abnormality via the operation unit CPU serial communication bus 311.

In step S408, the application program checks whether an abnormality of the touch panel controller 303 is detected.

If an abnormality of the touch panel controller 303 is not detected (NO in step S408), the processing proceeds to step S410.

On the other hand, if an abnormality of the touch panel controller 303 is detected (YES in step S408), the processing proceeds to step S409. In step S409, the application program records information indicating that the detected abnormality is an abnormality of the operation system that disables proper acquisition of a coordinate value of a user operation, in the RAM 203. At the same time, the application program records the information indicating the abnormality of the operation system in the HDD 204.

Next, in step S410, the application program transmits an instruction for checking whether the operation unit CPU 309 properly controls the image output IC 307 to the operation unit CPU 309 via the operation unit CPU serial communication bus 311. In addition, the operation unit CPU 309 performs communication with the image output IC 307 via the image output IC communication bus 308, and if an abnormality is detected, the operation unit CPU 309 notifies the application program of the abnormality via the operation unit CPU serial communication bus 311.

In step S411, the application program checks whether an abnormality of the image output IC 307 is detected.

If an abnormality of the image output IC 307 is not detected (NO in step S411), the abnormality detection processing illustrated in the flowchart of FIG. 4 is ended.

On the other hand, if an abnormality of the image output IC 307 is detected (YES in step S411), the processing proceeds to step S412. In step S412, the application program records information indicating that the detected abnormality is an abnormality of the display system that disables proper screen display, in the RAM 203. At the same time, the application program records information indicating the abnormality of the display system in the HDD 204, and the abnormality detection processing illustrated in the flowchart of FIG. 4 is ended.

Figure 5:
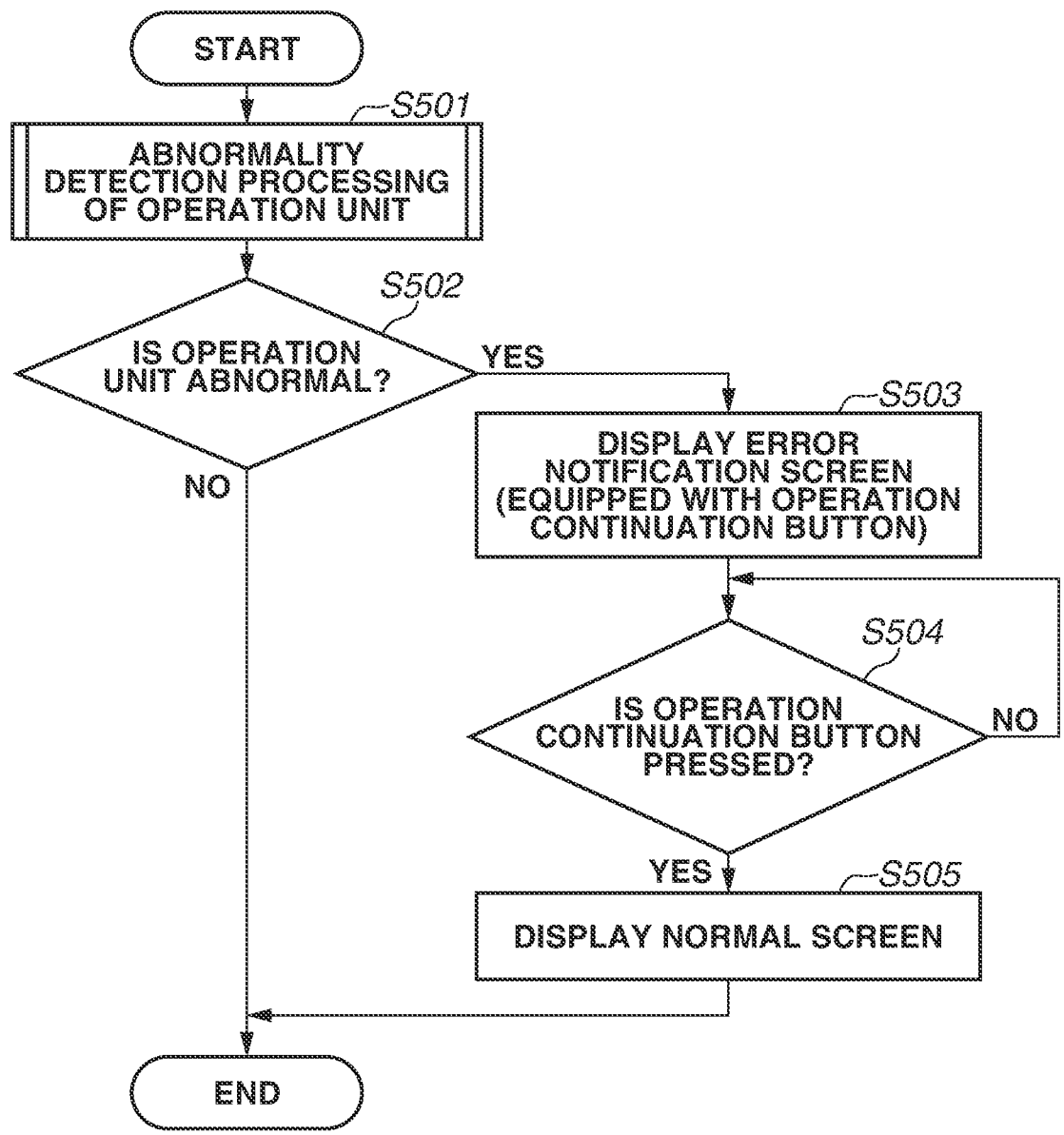
FIG. 5 is a flowchart illustrating a flow of switch processing of an error notification screen according to a first exemplary embodiment.

FIG. 5 is a flowchart illustrating a flow of processing of switching screen display for error notification after the abnormality detection processing of the operation unit 106 is performed. The processing is executed by an application program operating on the CPU 201 of the information processing controller unit 101.

Figure 7:
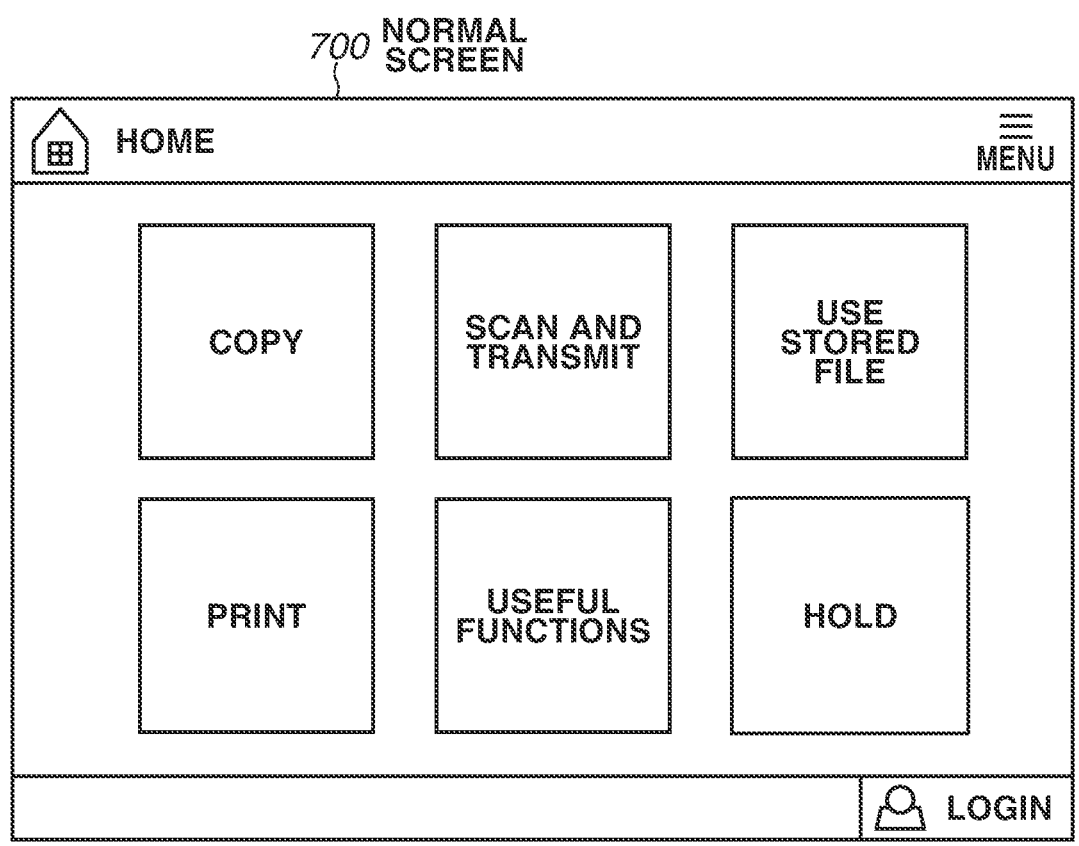
FIG. 7 illustrates an example of a normal screen.

In addition, FIGS. 6 and 7 each illustrate a GUI screen to be displayed on the LCD unit 305 of the operation unit 106 in the steps of processing illustrated in FIG. 5.

FIG. 6 illustrates an example of an error notification screen 600 to be displayed for notifying the user of an error. In the error notification screen 600, the error code 601 indicating the type of an error and the error location code 602 indicating a location where the error has occurred are displayed. In addition, a "CONTINUE OPERATION" software switch 603 functioning as an instruction portion to be pressed by the user to continue the operation is disposed. In addition, a message 604 for instructing the user to turn ON/OFF the power of the MFP 100 is displayed so as to prompt the user to turn on again the power switch of the MFP 100 (to restart the MFP 100).

If the MFP 100 normally operates after the user turns on again the power switch of the MFP 100 based on the message 604, the user can restart a normal operation.

On the other hand, if the MFP 100 does not normally operate even though the user turns on again the power switch, a normal operation cannot be restarted. Nevertheless, in a case where abnormality has occurred only in the operation unit 106, the execution of primary functions of the MFP 100 such as copying and printing may not be disturbed in sonic cases. In these cases, by selecting the "CONTINUE OPERATION" software switch 603, the user can continue the execution of such functions.

FIG. 7 illustrates an example of a normal screen 700 to be displayed during a normal operation with no error. In the normal screen 700, buttons for executing functions of the MFP 100 such as copying and printing are displayed.

First of all, in step S501, the application program performs the abnormality detection processing of the operation unit 106, which has been described with reference to FIG. 4.

Next, in step S502, the application program checks whether information indicating an abnormality of the operation unit 106 is recorded in the RAM 203.

If information indicating that an abnormality of the operation unit 106 is not recorded (NO in step S502), the processing illustrated in FIG. 5 is ended.

On the other hand, if some sort of information indicating an abnormality of the operation unit 106 is recorded (YES in step S502), the processing proceeds to step S503. Then in step S503, to notify the user of the error, the application program generates image data for displaying the error notification screen 600 illustrated in FIG. 6, and transmits the generated image data to the operation unit 106 via the display signal bus 310.

Subsequently, in step S504, the application program checks whether the "CONTINUE OPERATION" software switch 603 that is displayed in the error notification screen 600 illustrated in FIG. 6 is pressed by the user. At this time, the application program acquires a coordinate value of a user operation performed on the touch panel 301, via the operation unit CPU serial communication bus 311.

If the application program checks that the "CONTINUE OPERATION" software switch 603 is pressed by the user (YES in step S504), the processing proceeds to step S505. In step S505, the application program displays the normal screen 700 illustrated in FIG. 7. The processing illustrated in FIG. 5 is then ended.

The above-described processing is performed to control an operation of the operation unit 106 if an abnormality of the operation unit 106 is detected, and does not stop or change operations of components other than the operation unit 106.

According to the present exemplary embodiment, in a case where an operation unit of an image processing apparatus malfunctions, it is possible to notify the user of an error using an appropriate method based on a malfunction status of the operation unit. With this configuration, in a case where only the operation unit malfunctions, the user can continuously use the image processing apparatus without stopping all the functions.

Hereinafter, a second exemplary embodiment will be described. In the first exemplary embodiment, if an abnormality of the display system occurs in the operation unit 106, a screen may fail to be properly displayed. In addition, if an abnormality of the operation system occurs, the user's pressing of the "CONTINUE OPERATION" software switch 603 may fail to be properly detected. In view of the foregoing, in the second exemplary embodiment, if an abnormality of the operation unit 106 is detected, remote display, remote control, and error notification are performed in a client terminal 800 remotely connected via a network.

Figure 8:
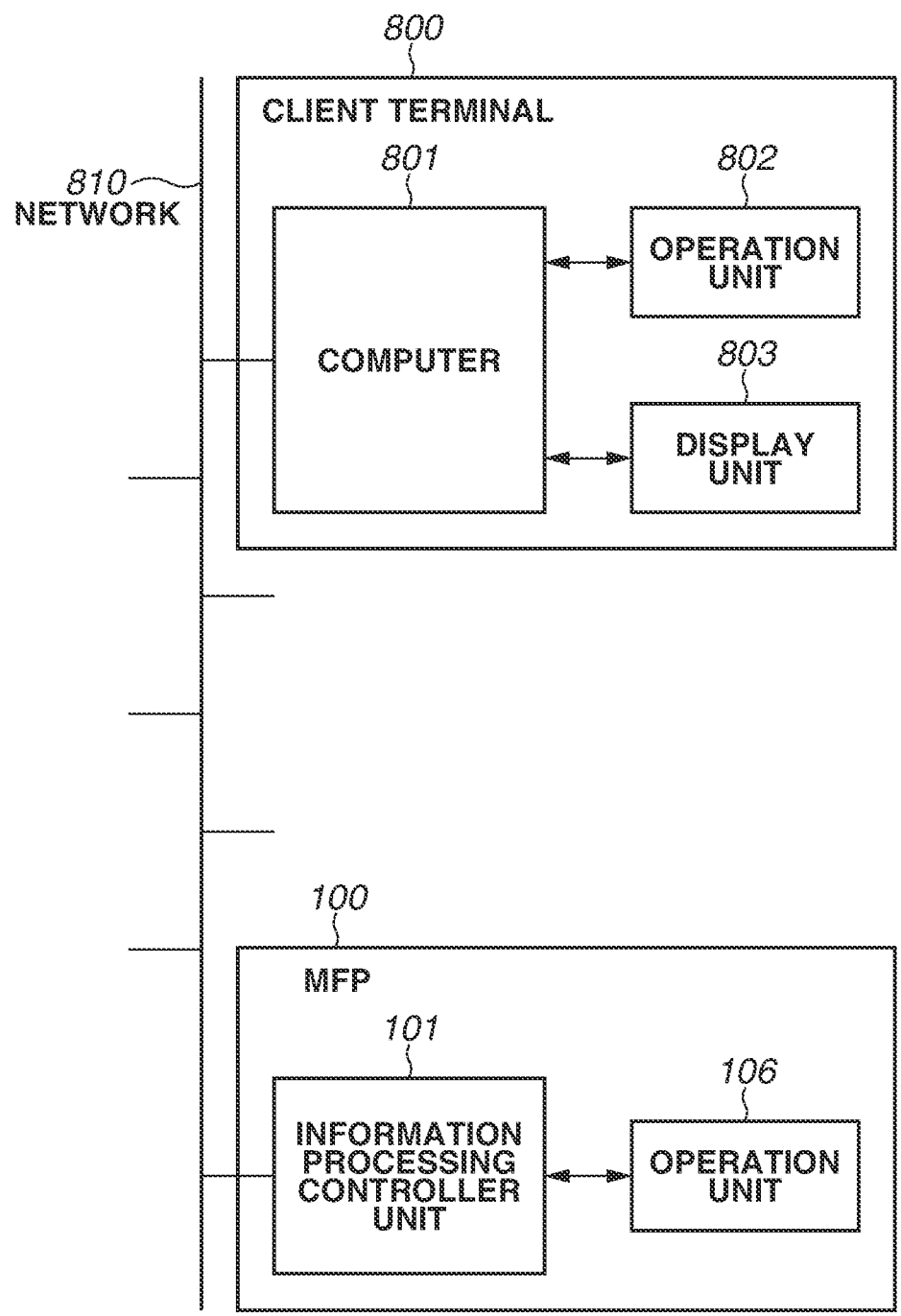
FIG. 8 is a block diagram illustrating a configuration of an image processing system including a client terminal.

FIG. 8 is a block diagram illustrating a configuration of an image processing system including the client terminal 800.

The client terminal 800 is remotely connected to the MFP 100 via a network 810. The client terminal 800 includes a computer 801, an operation unit 802 including a keyboard, a mouse, or the like, and a display unit 803 including a display or the like. The client terminal 800 is configured of an information processing terminal such as a general personal computer (PC). Alternatively, the client terminal 800 may be a tablet terminal or a mobile terminal including the computer 801, a display (display unit), and a touch panel (operation unit) that are integrally formed.

The computer 801 implements various functions by executing an application program. In addition, the computer 801 is mutually connected to the MFP 100 and other external devices via the network 810, and performs input-output of information.

The application program executes processing based on information input by the user via the operation unit 802. In addition, the application program generates image data for screen display that is to be displayed on the display unit 803, and outputs the generated image data to the display unit 803.

In the second exemplary embodiment, a GUI screen is displayed on the operation unit 106 of the MFP 100, and remote display and remote control are performed in the computer 801 of the client terminal 800 connected via the network 810.

The GUI screen generated by the information processing controller unit 101 is displayed via the network 810 on the display unit 803 connected to the computer 801. In addition, a coordinate value of a user operation detected on the operation unit 802 is transmitted to the information processing controller unit 101 via the network 810.

An application program operating on the information processing controller unit 101 has a virtual network computing (VNC) server function. In addition, an application program operating on the computer 801 has a VNC client function. The VNC server function and the VNC client function can perform network communication using a remote frame buffer (RFB) protocol.

As a method for establishing connection for remote display and remote control, a remote control application other than the VNC may be used. For example, there have been methods of performing drawing and operations of a screen using a remote desktop protocol (RDP) and a hypertext transfer protocol (HTTP), and these methods can also be used.

Figure 9:
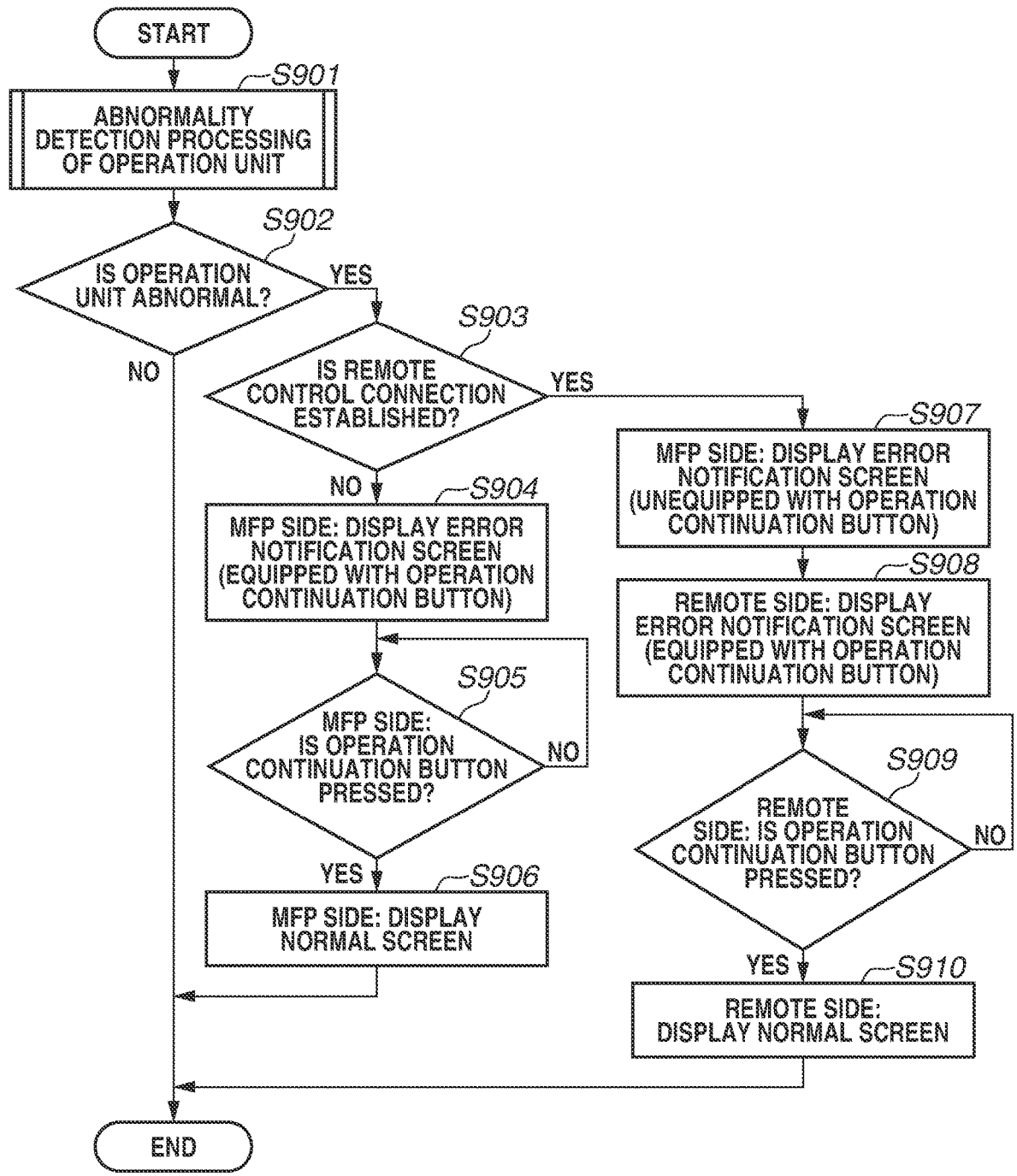
FIG. 9 is a flowchart illustrating a flow of switch processing of an error notification screen according to a second exemplary embodiment.

FIG. 9 is a flowchart illustrating a flow of processing of switching screen display for error notification after the abnormality detection processing of the operation unit 106 is performed according to the second exemplary embodiment. The processing is executed by an application program operating in the CPU 201 of the information processing controller unit 101.

First of all, in step S901, the application program performs the abnormality detection processing of the operation unit 106, which has been described with reference to FIG. 4.

Next, in step S902, the application program checks whether information indicating an abnormality of the operation unit 106 is recorded in the RAM 203.

If information indicating an abnormality of the operation unit 106 is not recorded (NO in step S902), the processing illustrated in the flowchart of FIG. 9 is ended.

On the other hand, if some sort of information indicating an abnormality of the operation unit 106 is recorded (YES in step S902), the processing proceeds to step S903. Then in step S903, the application program checks whether the VNC server function is connected to the VNC client function of the remote computer 801 via the network 810.

If the VNC server function and the VNC client function are not connected (NO in step S903), the processing proceeds to step S904. Then, to notify the user of an error, the application program generates image data for displaying the error notification screen 600 illustrated in FIG. 6, and transmits the generated image data to the operation unit 106 via the display signal bus 310.

Subsequently, in step S905, the application program checks whether the "CONTINUE OPERATION" software switch 603 that is displayed on the error notification screen 600 illustrated in FIG. 6 is pressed by the user. At this time, the application program acquires a coordinate value of a user operation performed on the touch panel 301, via the operation unit CPU serial communication bus 311.

If the application program checks that the "CONTINUE OPERATION" software switch 603 is pressed by the user (YES in step S905), the processing proceeds to step S906. In step S906, the application program displays the normal screen 700 illustrated in FIG. 7. After that, the processing illustrated in the flowchart of FIG. 9 is ended.

Meanwhile, if the application program checks that the VNC server function and the VNC client function are connected (YES in step S903), the processing proceeds to step S907. Then, to notify the user of an error, the application program generates image data for displaying an error notification screen 1000 illustrated in FIG. 10, and transmits the generated image data to the operation unit 106 via the display signal bus 310.

Figure 10:
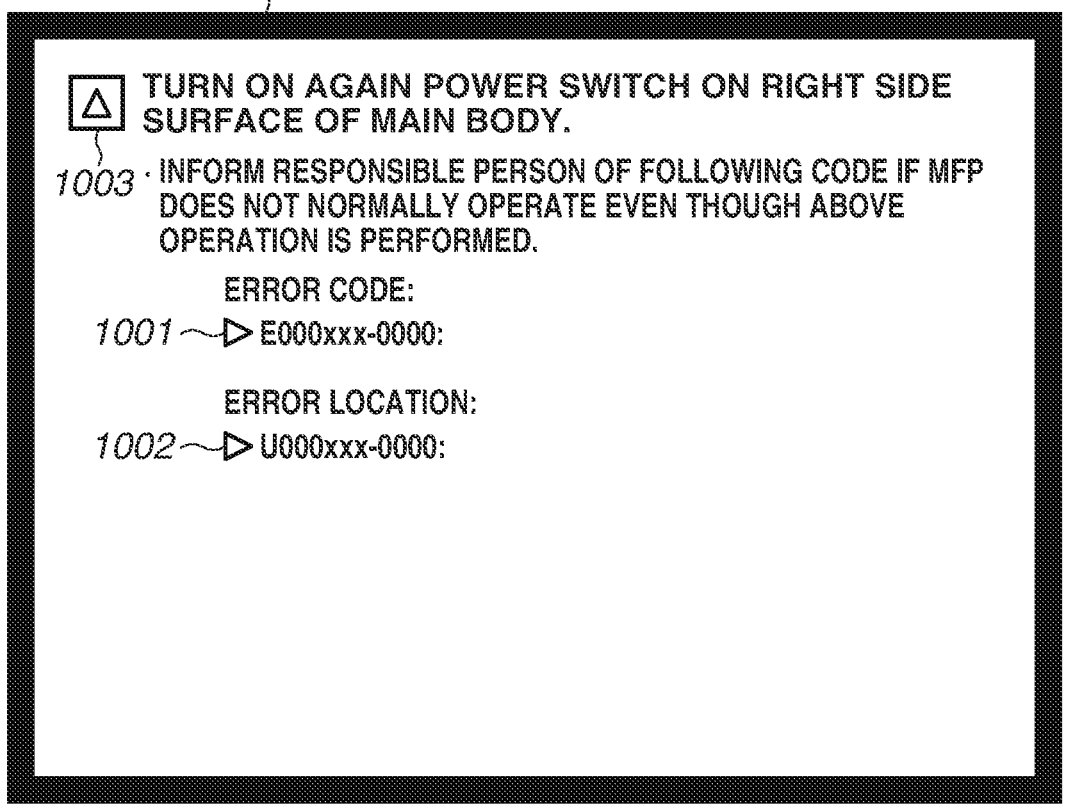
FIG. 10 illustrates an example of an error notification screen (unequipped with an operation continuation button).

FIG. 10 illustrates an example of the error notification screen 1000 to be displayed on the LCD unit 305 of the operation unit 106 in step S907 of FIG. 9 to notify the user of an error. On the error notification screen 1000, an error code 1001 indicating the type of an error and an error location code 1002 indicating a location where the error has occurred are displayed. In addition, a message 1003 for instructing the user to turn ON/OFF the power of the MFP 100 is displayed so as to prompt the user to turn on again the power switch of the MFP 100.

Unlike the error notification screen 600 illustrated in FIG. 6, the error notification screen 1000 is not equipped with a software switch operable by the user, thereby preventing the user from performing an erroneous operation.

In the present exemplary embodiment, the error notification screen 600 illustrated in FIG. 6 is displayed on the operation unit 106 of the MFP 100 in sonic cases, and the error notification screen 600 is displayed on the display unit 803 of the client terminal 800 in other cases.

Furthermore, in step S908, the application program generates image data for displaying the error notification screen 600 illustrated in FIG. 6. Then, the application program displays, via the VNC server function and the VNC client function, the generated image data on the display unit 803 of the computer 801 of the remotely-connected client terminal 800.

Subsequently, in step S909, the application program checks whether the "CONTINUE OPERATION" software switch 603 that is displayed on the error notification screen 600 is pressed by the user in the client terminal 800. At this time, the application program acquires a coordinate value of a user operation performed on the operation unit 802 of the computer 801, via VNC connection.

If the application program checks that the "CONTINUE OPERATION" software switch 603 is pressed by the user (YES in step S909), the processing proceeds to step S910. In step S910, the application program generates the normal screen 700 illustrated in FIG. 7. Then, the application program displays, via VNC connection, the generated normal screen 700 on the display unit 803 of the computer 801 of the remotely-connected client terminal 800. After that, the processing illustrated in FIG. 9 is ended.

The above description has been given of a configuration in which VNC connection is used as a method for performing remote display and remote control on the client terminal 800 from the MFP 100. Nevertheless, another method can also be used as described above.

For example, the MFP 100 can also use the structure of a remote user interface (UI) for performing drawing and operations of a screen on the computer 801 using HTTP communication. In this case, an application program operating on the information processing controller unit 101 of the MFP 100 has a web server function, and generates remote UI screen data including data described using a hypertext markup language (HTML) or a scripting language. An application program operating on the computer 801 has a web browser function, displays the remote UI screen data received from the MFP 100 via HTTP communication, and conveys a screen operation performed by the user to the MFP 100 as a response of HTTP communication.

Figure 14:
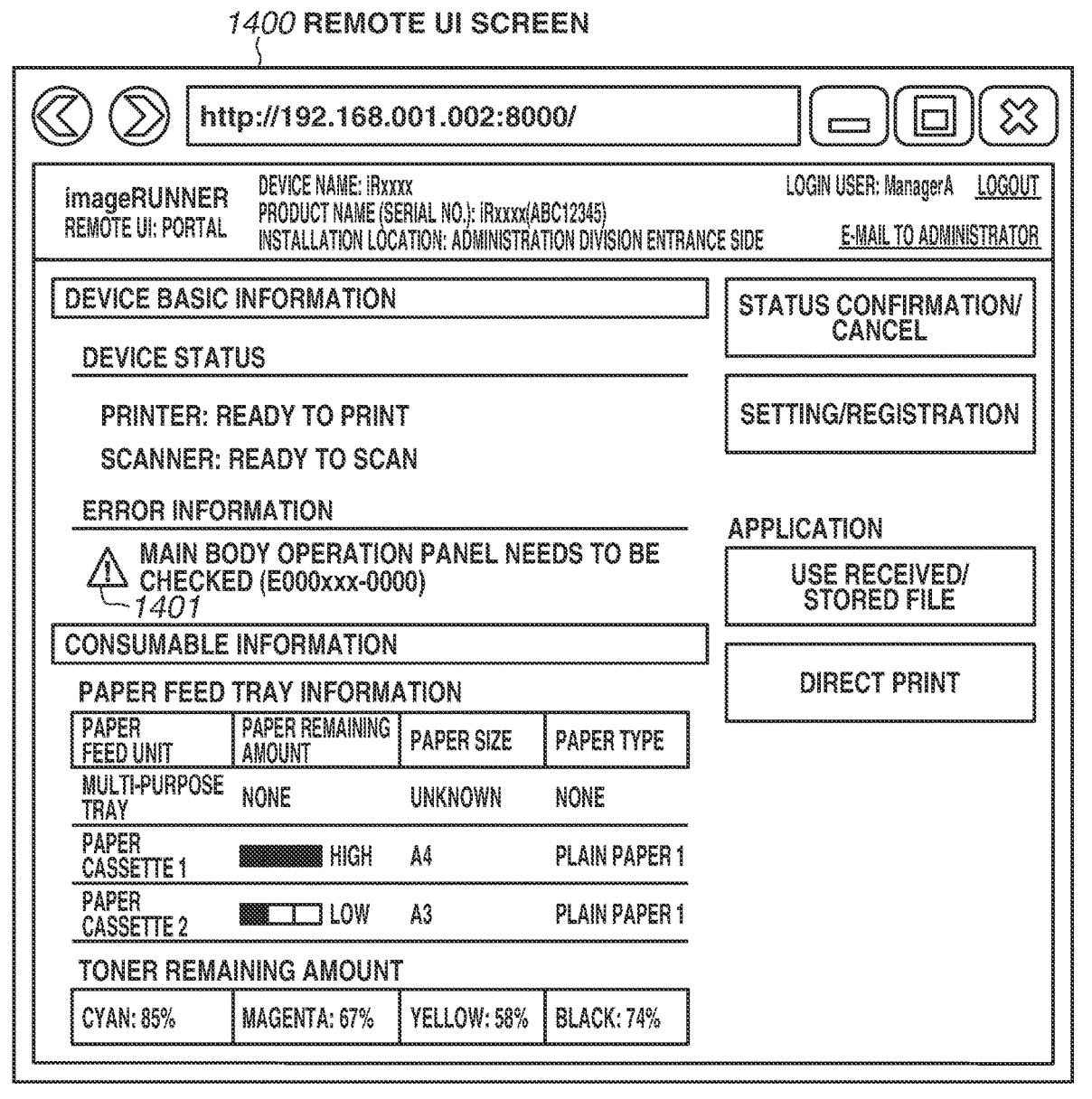

FIG. 14 illustrates an example of a remote UI screen 1400 to be displayed on the display unit 803 using the web browser function operating on the computer 801 of the client terminal 800. The user can be notified of a state where an abnormality has occurred in the operation unit 106 of the MFP 100 by displaying a malfunction status of the touch panel on the remote UI screen 1400 as error information 1401. If no error occurs in locations other than the operation unit 106, the user can execute various functions of the MFP 100 by operating various software switches on the remote UI screen 1400.

As described above, according to the second exemplary embodiment, displaying the error notification screen 600 operable by the user on the remote client terminal 800 allows the user to continuously use all the functions of the MFP 100. Meanwhile, displaying the error notification screen 1000 not equipped with a software switch operable by the user on the operation unit 106 of the MFP 100 prevents the user from performing an erroneous operation even in a case where a display system has an abnormality.

Hereinafter, a third exemplary embodiment will be described. In the second exemplary embodiment, in a case where an abnormality of a display system occurs in the operation unit 106, the MFP 100 notifies the user of the abnormality of the operation unit 106 while an operation continuation button is hidden so as to prevent the user from performing an erroneous operation. At the same time, the remote client terminal 800 notifies the user of the abnormality of the operation unit 106 while an operation continuation button is made operable.

As described above with reference to the flowchart illustrated in FIG. 4, as for an abnormality of the operation unit 106, it is impossible, or at least not possible, to distinguish between an abnormality of the display system and an abnormality of the operation system.

In view of the foregoing, in the third exemplary embodiment, a GUI screen to be displayed on the operation unit 106 is appropriately switched depending on whether the detected abnormality of the operation unit 106 is an abnormality of the display system or an abnormality of the operation system.

Figure 11:
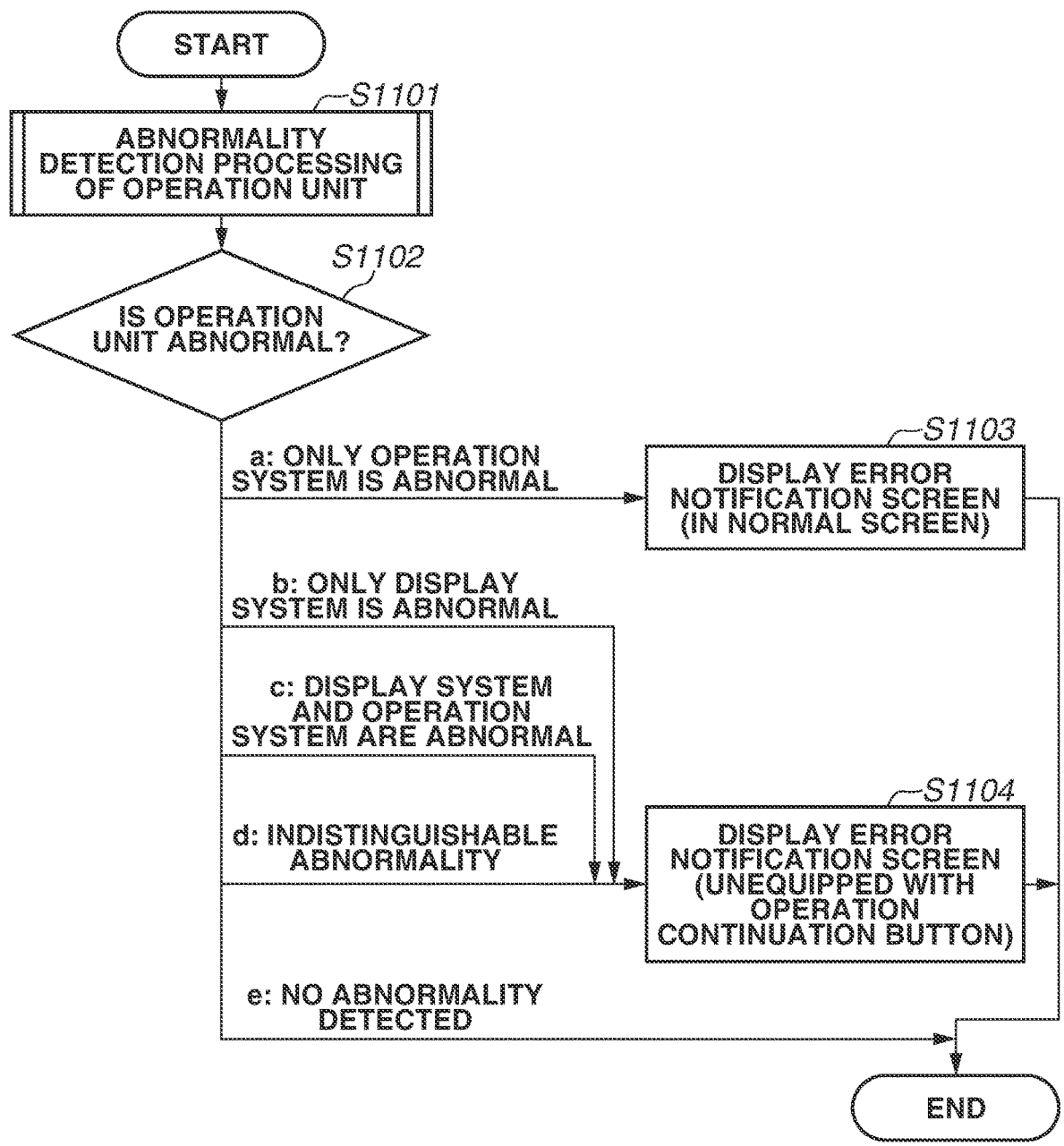
FIG. 11 is a flowchart illustrating a flow of switch processing of an error notification screen according to a third exemplary embodiment.

FIG. 11 is a flowchart illustrating a flow of processing of switching screen display for error notification after the abnormality detection processing of the operation unit 106 is performed according to the third exemplary embodiment. The processing is executed by an application program operating on the CPU 201 of the information processing controller unit 101.

Figure 12:
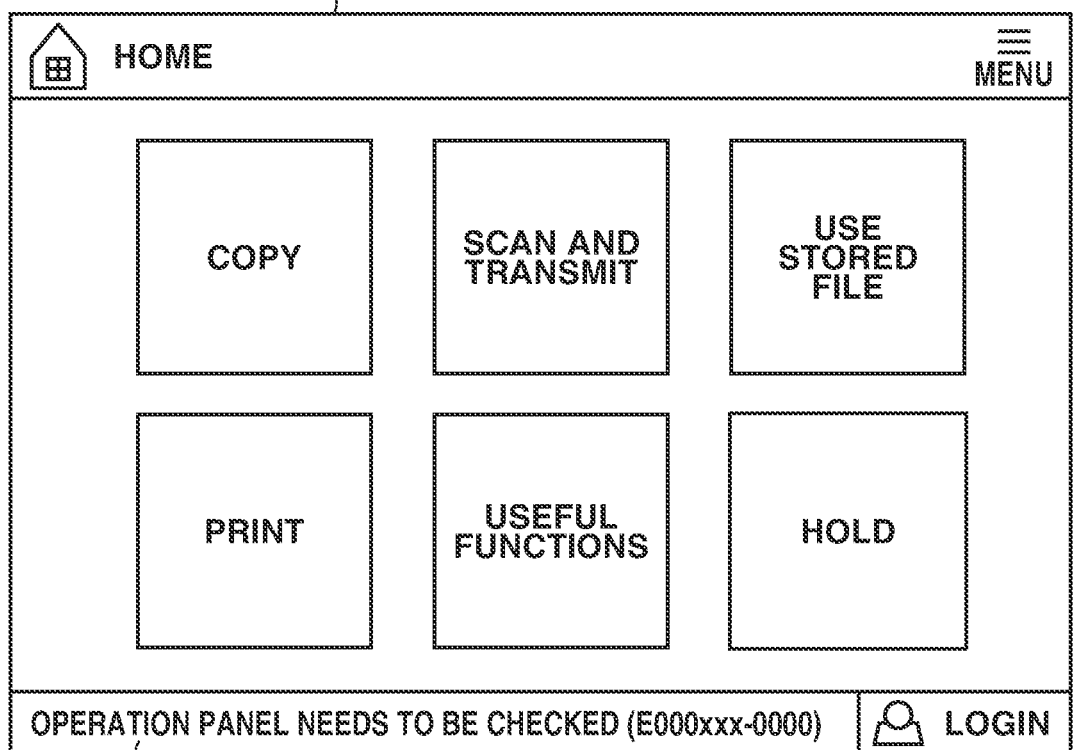
FIG. 12 illustrates an example of an error notification screen (in a normal screen).

FIG. 12 illustrates an example of an error notification screen 1200 to be displayed on the LCD unit 305 of the operation unit 106 of the MFP 100 in the processing illustrated in FIG. 11. The error notification screen 1200 notifies the user of an error of the operation unit 106 while the user is provided with normal operation functions similarly to the normal screen 700 illustrated in FIG. 7.

A status display area 1201 provided in a lower portion of the error notification screen 1200 is an area for presenting to the user various warning messages such as a message indicating the occurrence of jam in the printer 104 and a warning message regarding the amount of remaining paper, when a normal operation is performed in the MFP 100. In a case of notifying the user of a plurality of warning messages at the same time, all of the warning messages are made visible to the user by displaying the warning messages while sequentially switching the warning messages at intervals of a few seconds. In addition, an upper part of the screen other than the status display area 1201 corresponds to a normal operation screen similar to the normal screen 700 illustrated in FIG. 7.

First of all, in step S1101, the application program performs the abnormality detection processing of the operation unit 106, which has been described with reference to FIG. 4.

Next, in step S1102, the application program checks whether information indicating an abnormality of the operation unit 106 is recorded in the RAM 203, and switches the subsequent processing based on the recorded information.

If information recorded in the RAM 203 indicates only an abnormality of the operation system ("a: ONLY OPERATION SYSTEM IS ABNORMAL" in step S1102), the processing proceeds to step S1103. Then in step S1103, the application program generates image data for displaying the error notification screen 1200 illustrated in FIG. 12, and inserts a warning message indicating that an error has occurred into the status display area 1201 provided in the lower part of the screen. In addition, the application program transmits the generated image data to the operation unit 106 via the display signal bus 310. The user can simultaneously view all of the warning messages on the error notification screen 1200.

If information recorded in the RAM 203 indicates only an abnormality of the display system ("b: ONLY DISPLAY SYSTEM IS ABNORMAL" in step S1102), if the information indicates an abnormality of the display system and an abnormality of the operation system ("c: DISPLAY SYSTEM AND OPERATION SYSTEM ARE ABNORMAL" in step S1102), or if the abnormality is indistinguishable ("d: INDISTINGUISHABLE ABNORMALITY" in step S1102), the processing proceeds to step S1104.

Then in step S1104, to notify the user of an error, the application program generates image data for displaying the error notification screen 1000 illustrated in FIG. 10. The application program transmits the generated image data to the operation unit 106 via the display signal bus 310. Since the error notification screen 1000 is not equipped with a software switch operable by the user, it is possible to prevent the user from performing an erroneous operation.

If no abnormality of the operation unit 106 is recorded in the RAM 203 ("e: NO ABNORMALITY DETECTED" in step S1102), the application program does not perform the processing of changing a display screen, and the processing illustrated in the flowchart of FIG. 11 is ended.

Hereinafter, a fourth exemplary embodiment will be described. In the third exemplary embodiment, an erroneous operation by a user on the operation unit 106 can be prevented by displaying a screen unequipped with a software switch operable by the user in a case where an abnormality of the operation unit 106 is an abnormality of the display system.

In the fourth exemplary embodiment, in contrast, the user is prevented from performing an erroneous operation by disabling the acquisition of a coordinate value of a user operation performed on the operation unit 106 in a case where an abnormality of the operation unit 106 is an abnormality of the display system.

Figure 13:
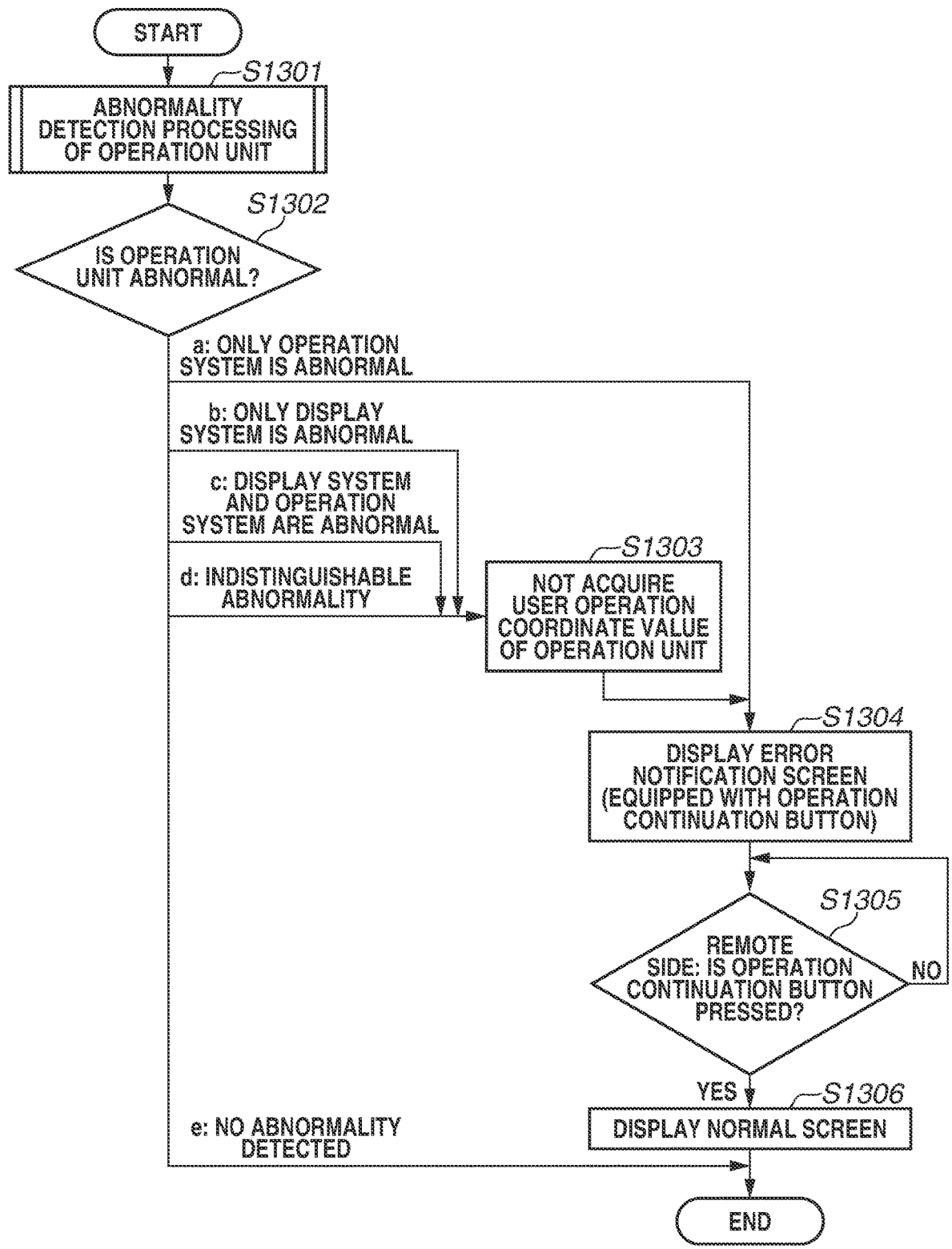
FIG. 13 is a flowchart illustrating a flow of switch processing of an error notification screen according to a fourth exemplary embodiment.

FIG. 13 is a flowchart illustrating a flow of processing of switching screen display for error notification after the abnormality detection processing of the operation unit 106 is performed according to the fourth exemplary embodiment. The processing is executed by an application program operating on the CPU 201 of the information processing controller unit 101.

First of all, in step S1301, the application program performs the abnormality detection processing of the operation unit 106, which has been described with reference to FIG. 4.

Next, in step S1302, the application program checks whether information indicating an abnormality of the operation unit 106 is recorded in the RAM 203, and switches the subsequent processing based on the recorded information.

If the information recorded in the RAM 203 indicates only an abnormality of the operation system ("a: ONLY OPERATION SYSTEM IS ABNORMAL" in step S1302), the processing proceeds to step S1304. Then in step S1304, to notify the user of an error, the application program generates image data for displaying the error notification screen 600 illustrated in FIG. 6, and transmits the generated image data to the operation unit 106 via the display signal bus 310.

If the information recorded in the RAM 203 indicates only an abnormality of the display system ("b: ONLY DISPLAY SYSTEM IS ABNORMAL" in step S1302), if the information indicates an abnormality of the display system and an abnormality of the operation system ("c: DISPLAY SYSTEM AND OPERATION SYSTEM ARE ABNORMAL" in step S1302), or if the abnormality is indistinguishable ("d: INDISTINGUISHABLE ABNORMALITY" in step S1302), the processing proceeds to step S1303.

Then in step S1303, the application program stops the use of a coordinate value of a user operation performed on the touch panel 301 that is to be acquired from the operation unit 106 via the operation unit CPU serial communication bus 311, in the processing performed in the application program. At this time, remote control performed via VNC connection is considered to be activated at the same time, but a coordinate value of a user operation that is acquired via VNC connection is made usable in the processing performed in the application program.

After that, in step S1304, to notify the user of an error, the application program generates image data for displaying the error notification screen 600 illustrated in FIG. 6. Then, the application program transmits the generated image data to the operation unit 106 via the display signal bus 310.

Subsequently, in step S1305, the application program acquires a coordinate value of a user operation and checks whether the "CONTINUE OPERATION" software switch 603 that is displayed on the error notification screen 600 is pressed by the user.

At this time, in a case where a coordinate value of a user operation performed on the touch panel 301 is set not to be used in the processing in step S1303, a user operation performed on the touch panel 301 is disabled. Nevertheless, a user operation is enabled on the error notification screen 600 displayed on the display unit 803 of the VNC-connected client terminal 800. Thus, the application program checks whether the "CONTINUE OPERATION" software switch 603 that is displayed on the error notification screen 600 displayed on the display unit 803 is pressed by the user.

If the application program checks that the "CONTINUE OPERATION" software switch 603 is pressed by the user (YES in step S1305), the processing proceeds to step S1306. Then in step S1306, the application program displays the normal screen 700 illustrated in FIG. 7 on the LCD unit 305 of the operation unit 106. The application program also displays the same normal screen 700 on the display unit 803 of the VNC-connected computer 801. Then, the processing illustrated in the flowchart of FIG. 13 is ended.

If no abnormality of the operation unit 106 is recorded in the RAM 203 ("e: NO ABNORMALITY DETECTED" in step S1302), the application program does not perform processing of changing a display screen, and the processing illustrated in the flowchart of FIG. 13 is ended.

The present disclosure may be applied to a system including a plurality devices, or may be applied to an apparatus including a single device.

The present disclosure is not limited to the above-described exemplary embodiments. Various modifications can he made based on the spirit of the present disclosure, and these modifications are not excluded from the scope of the present disclosure. In other words, combinations of the above-described exemplary embodiments and modified examples thereof are all included in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-004840, filed Jan. 16, 2019, which is hereby incorporated by reference herein in its entirety.

What is claimed is:

1. An image processing apparatus having an operation unit and a sensor, wherein the operation unit includes a display device and the sensor is configured to detect an abnormality of the operation unit, the image processing apparatus comprising:
one or more processors; and
memory storing instructions that, when executed by the one or more processors, cause the image processing apparatus to perform operations including:
generating, in a case where the sensor detects an abnormality of the operation unit, display data for performing display including a first error notification regarding the detected abnormality,
providing the generated display data to at least one of the display device and an information processing apparatus connected via a network using a remote control application, and
providing screen data, in a case where (i) first data for performing display includes the first error notification, includes an instruction portion configured to receive an instruction to continuously use the image processing apparatus, and is provided as provided display data, and
(ii) an instruction to continuously use the image processing apparatus is received via the instruction portion,
wherein the screen data is data for, in place of the display includes the first error notification, displaying a screen for using a function of the image processing apparatus.

2. The image processing apparatus according to claim 1, wherein the first error notification includes a message for prompting restart of the image processing apparatus.

3. The image processing apparatus according to claim 1, wherein providing the provided display data includes providing the first data to the information processing apparatus, and providing second data for performing display including the first error notification and not including the instruction portion is provided to the display device.

4. The image processing apparatus according to claim 1, wherein, in a case where the information processing apparatus is not connected using the remote control application, herein providing the provided display data includes providing the first data to the display device.

5. The image processing apparatus according to claim 1, wherein, in a case where an abnormality of the operation unit detected by the sensor includes an abnormality related to display on the display device, providing the provided display data includes providing the first data to the information processing apparatus and providing second data for performing display to the display device, where the second data includes the first error notification and does not include the instruction portion.

6. The image processing apparatus according to claim 1, wherein, in a case where an abnormality of the operation unit detected by the sensor does not include an abnormality related to display on the display device, providing the provided display data includes providing the first data to the display device and to the information processing apparatus.

7. A method for an image processing apparatus having an operation unit and a sensor, wherein the operation unit includes a display device and the sensor is configured to detect an abnormality of the operation unit, the method comprising:
generating, in a case where the sensor detects an abnormality of the operation unit, display data for performing display including a first error notification regarding the detected abnormality,
providing the generated display data to at least one of the display device and an information processing apparatus connected via a network using a remote control application, and
providing screen data, in a case where (i) first data for performing display includes the first error notification, includes an instruction portion configured to receive an instruction to continuously use the image processing apparatus, and is provided as provided display data, and
(ii) an instruction to continuously use the image processing apparatus is received via the instruction portion,
wherein the screen data is data for, in place of the display includes the first error notification, displaying a screen for using a function of the image processing apparatus.

8. A non-transitory computer-readable storage medium storing a program to cause a computer to perform a method for an image processing apparatus having an operation unit and a sensor, wherein the operation unit includes a display device and the sensor is configured to detect an abnormality of the operation unit, the method comprising:

generating, in a case where the sensor detects an abnormality of the operation unit, display data for performing display including a first error notification regarding the detected abnormality, providing the generated display data to at least one of the display device and an information processing apparatus connected via a network using a remote control application, and providing screen data, in a case where (i) first data for performing display includes the first error notification, includes an instruction portion configured to receive an instruction to continuously use the image processing apparatus, and is provided as provided display data, and (ii) an instruction to continuously use the image processing apparatus is received via the instruction portion, wherein the screen data is data for, in place of the display includes the first error notification, displaying a screen for using a function of the image processing apparatus.

* * * * *